United States Patent [19]

Fucili et al.

[11] Patent Number: 5,886,484
[45] Date of Patent: Mar. 23, 1999

[54] MASKING OF SWITCHING NOISE IN CONTROLLING A "H" BRIDGE

[75] Inventors: Giona Fucili, Magenta; Maurizio Nessi, Como, both of Italy

[73] Assignee: SGS-Thomson Microelectronics, S.r.l., Milan, Italy

[21] Appl. No.: 650,531

[22] Filed: May 20, 1996

[30] Foreign Application Priority Data

May 23, 1995 [EP] European Pat. Off. ............ 95830218

[51] Int. Cl.$^6$ .................................................. H02K 23/00
[52] U.S. Cl. ...................... 318/254; 318/439; 318/138; 388/804; 388/811; 388/819
[58] Field of Search ...................... 318/439, 254, 318/138; 388/804, 811, 819; 363/98, 41

[56] References Cited

U.S. PATENT DOCUMENTS

| | | | |
|---|---|---|---|
| 4,370,702 | 1/1983 | Shuet et al. ................................ | 363/42 |
| 5,153,492 | 10/1992 | Landseadel . | |
| 5,202,614 | 4/1993 | Peters et al. . | |
| 5,202,616 | 4/1993 | Peters et al. . | |
| 5,210,479 | 5/1993 | Kimura et al. ........................... | 318/727 |
| 5,258,696 | 11/1993 | Le . | |
| 5,317,243 | 5/1994 | Cameron ................................. | 318/254 |
| 5,319,289 | 6/1994 | Austin et al. . | |
| 5,343,127 | 8/1994 | Maiocchi . | |
| 5,574,346 | 11/1996 | Chavan et al. .......................... | 318/434 |

FOREIGN PATENT DOCUMENTS

| | | |
|---|---|---|
| 0391574 | 10/1990 | European Pat. Off. . |
| 0529366 | 3/1993 | European Pat. Off. . |

OTHER PUBLICATIONS

IEEE Transactions on Consumer Electronics, vol. 35, No. 3, Aug., 1989, "A Full–Wave Motor Drive IC Based on the Back–EMF Sensing Principle", Bahlmann, pp. 415–420.
Electronic Components and Applications, vol. 10, No. 3, "Full–wave sensorless drive ICs for brushless DC motors", Dominique Pouilloux, pp. 2–11.

Proceedings of the Conference on Drives/Motors/Controls 1984, Paraskeva et al., "Microprocessor Control of a Brushless DC motor".

Self Synchronisation of PM Step and Brushless Motors: A New Sensorless Approach, Antognini et al.

U.S. Patent Application of: Walter S. Gontowski, Jr. entitled "Sensorless Motor Driver with BEMF Mask Extender", Serial No. 08/393,706.

U.S. Patent Application of: Walter S. Gontowski, Jr. entitled "Motor Control with Clamped Filter Output", Serial No. 08/140,220.

*Primary Examiner*—William M. Shoop, Jr.
*Assistant Examiner*—Kim Lockett
*Attorney, Agent, or Firm*—Allen, Dyer, Doppelt, Milbrath & Gilchrist, P.A.

[57] ABSTRACT

Masking of switching noise is implemented in the driving system of an "H" bridge stage by exploiting the periodic signal generated by a PWM control circuit (normally present in the control system for controlling the "H" bridge in an open-loop mode) for masking the decay time of the disturbances caused by the switching from off-to-on of a first pair of switches of the bridge that drive a current in a certain direction through the load. This is implemented by keeping high for a preset period of time the periodic signal generated by the PWM circuit and varying the duty-cycle of the signal for regulating the mask time in function of the load characteristics. The system further comprises the masking of the decay interval of the disturbances caused by the switching from on-to-off of the first pair of switches and from off-to-on of the other pair of switches that provides a current ricirculation path of the energy stored in the reactance of the load, for a preset number of clock cycles, thus impeding any subsequent switching for the duration of this second mask. This second mask may be realized in different ways. The use of an up-counter and a programmable comparator is preferred.

23 Claims, 4 Drawing Sheets

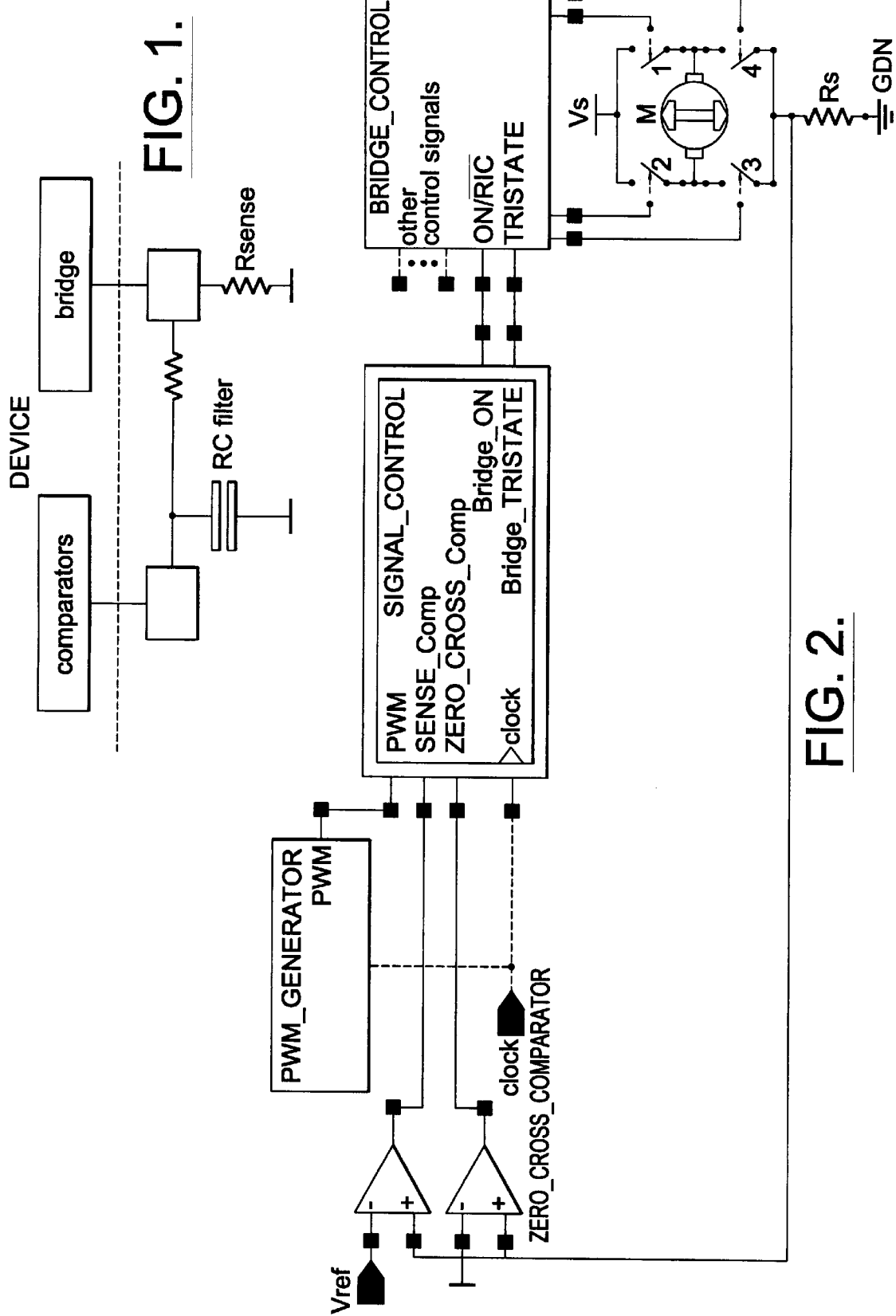

MASKING OF SWITCHING NOISE IN CONTROLLING A "H" BRIDGE

FIELD OF THE INVENTION

In general terms, this invention relates to driving in a commutative mode a reactive load by means of a H-bridge composed of at least four switches, controlled in pairs. More particularly, this invention is concerned with bridge control circuits when functioning in a closed-loop mode. The invention is in particularly, but not exclusively, suitable for driving DC motors.

BACKGROUND OF THE INVENTION

The H-bridge stage, essentially made of four switches that are typically transistors of the bipolar or of the field effect type, is well known and widely used for driving reactive loads, as for example electric motors, solenoids or the like.

Driving in a swithing mode of such loads may occur according to an open-loop mode by employing for instance a pulse width modulation (PWM) circuit generating a periodic control signal with a variable duty-cycle for turning on/off the switches of the H-bridge. The duty-cycle of the PWM periodic signal is regulated for controlling the load. In practice, the circuit behaves as a generator of a clock or timing signal with a variable frequency so as to vary, for example, the rotation speed of a DC motor driven by the bridge.

In many applications, where at least during some phases of operation, it is necessary to control the load in a more precise and reliable way, a control feedback loop is realized by monitoring the current that flows through the load by the use of a sensing resistance connected in series to the bridge stage and comparing the voltage present on the sensing resistance by the use of one or more comparators. Typically, in a current-mode control loop, a first and second comparator are required. The first comparator is used for comparing the voltage on the sensing resistance with ground or virtual ground potential (zero crossing comparator). The second comparator is used for comparing the same voltage present on the sensing resistance with an adjustable reference voltage (sensing comparator).

In this operating mode, the turn-on fronts for the load-driving pair of switches can be provided by the same PWM circuit where such is present for implementing an open-loop mode of load control during different operating phases. By contrast, the turn-off fronts for the load-driving switches may be provided by the output of the sensing comparator.

As a matter of fact, very often the bridge control system is designed to alternatively implement an open-loop type of control or a closed-loop type of control.

This is the case for example of a DC motor used for advancing a paper ribbon through a printer. A fast page feed is implemented by driving the paper advancing motor in an open-loop mode, whereas the motor is driven in a closed-loop mode in order to exert a precise control of the line feed during printing. Of course, there are many other applications that take advantage of the possibility of commanding a control according to one or the other mode.

Often, when the system is functioning in a closed-loop mode, the switching noise generated by the bridge's switches can have an amplitude such as to cause spurious switchings. To avoid this drawback, it is a common practice to employ a number of RC filters or more generally analog lowpass filters to reject switching noise, generated at every change of state of the bridge's switches.

According to one of the many ways of driving a DC motor, the control of the four switches of a H-bridge stage implies turning on a first pair of switches during an excitation phase (Bridge_ON), the turning on of the second pair of switches and the turning off of the first pair during a current recirculation phase (Bridge_RIC) for discharging the energy stored in the motor winding inductance, and eventually the turning off of all the switches for setting the bridge in a so-called "tristate" condition (high impedance). Therefore, at every change of configuration of the bridge's switches, switching spikes that are eventually read by the control comparators may (if their amplitude and/or persistence is sufficient) cause false or improper switching commands. These disturbances are commonly filtered by low-pass filters having a time constant that can be adjusted in function of the type of motor or reactive load to be driven.

FIG. 1 is a basic scheme of the use of an RC lowpass filter realized by connecting external components to dedicated pins of the integrated device and to a ground node of the load supply circuit.

The use of lowpass analog filters (RC) requires at least a dedicated pin coinciding with the sensing and input node of each comparator. Of course, an alternative is that of realizing RC filter components in an integrated form within the device. This situation, apart from not allowing an adaptation of the integrated device to the specific impedance characteristics of the external load, requires a conspicuous area of integration.

On the other hand, logic filtering techniques of switching noise are commonly based on processing a certain input logic signal containing noises by means of a logic circuitry that comprises at least a delay network, necessary for producing an output logic signal coinciding with the input logic signal but free of noise. Even in this case it is necessary to employ RC delay networks or equivalents and furthermore these circuits are hardly adaptable to specific impedance characteristics of the load.

OBJECT AND SUMMARY OF THE INVENTION

There is therefore a need and/or utility for a control system of a bridge stage driving a reactive load that may be set to function in a closed-loop mode, at least during certain phases of operation, in which the switching noise is effectively filtered and which is simple to integrate and readily adaptable to the load characteristics.

The method of this invention consists in the utilization of a signal produced by a pulse width modulation (PWM) circuit normally present and employed for driving the bridge in an open-loop mode, for masking the decay interval of the switching noise, that is of the disturbaces caused when a first pair of switches that determine a current flow in a certain direction through the bridge load switch from an OFF state to an ON state. This is achieved by keeping high for a preestablished period of time the periodic signal produced by the PWM block, varying accordingly the signal duty-cycle for regulating the masking interval (i.e. the masking time that follows the instant of switching), in function of the characteristics of the driven load.

Moreover, the method consists of masking the decay time interval of the switching noise caused when the first pair of switches are commanded to an OFF state and the other pair of switches that provide a current recirculation path for the discharge the load's reactance, are commanded to an ON state, for a preestablished number of cycles of the system's timing (clock) signal, thus impeding any further switching for the duration of this second mask.

Naturally, outside the first and second mask intervals the system maintains control of the voltage present on the sensing resistance and of the current flowing through the load according to a closed-loop mode of control. As soon as this voltage, from a negative value, reaches the zero value, the bridge is set in a so-called "tristate" condition, by commanding to an OFF state all four switches of the H-bridge stage. This prevents the bridge from causing an undue inversion of the direction of rotation as could occur when driving a DC motor.

When driving a DC motor, an eventual accidental inversion of the direction of rotation is related to a series of cofactors such as: an "excessively long" period of the PWM signal, a too low value of the reference voltage of the sensing comparator, the type of motor, etc. In any case, such an inversion may have a nonnegligible probability of occurring in many situations and this must be positively impeded to avoid a possible "loss of control" by the system.

The second mask can be implemented by an analog monostable circuit, by a prechargeable n-bit down-counter, or better still, by an n-bit up-counter, capable of counting the pulses of the timing (clock) signal, "read" by a programmable n-bit comparator capable of generating (on a programming basis) a stop signal of the masking period. This facilitates the regulation of the mask interval in function of the load characteristics.

The control system of the invention realizes in an extremely simple and efficient way a precise control of the load. The system is substantially immune to switching noise and permits the inversion of the direction of the flow of current through the load and the switching from a closed-loop mode to an open-loop mode of control and viceversa.

BRIEF DESCRIPTION OF THE DRAWINGS

The various aspects and advantages of this invention will be more evident through the following description of some important embodiments and by referring to annexed drawings, where:

FIG. 1 is a basic diagram showing the use of a lowpass external filter for filtering the switching noise according to a well known technique already referred to above;

FIG. 2 is a basic block diagram of the control system of this invention;

DESCRIPTION OF PREFERRED EMBODIMENTS

Figure 3:
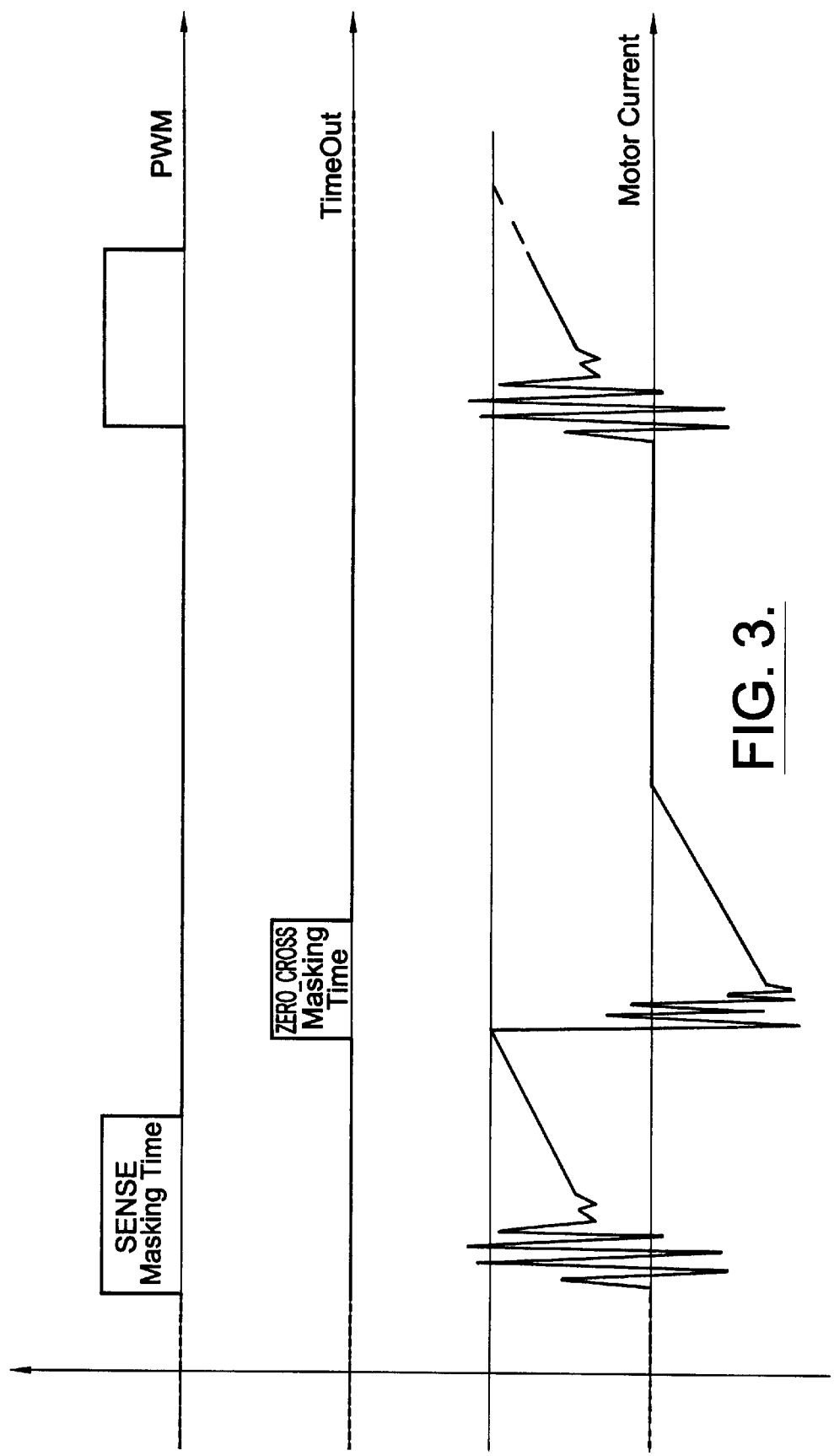
FIG. 3 shows the diagrams of operation in a closed-loop mode of the system of this invention.

With reference to the basic scheme of FIG. 2, a H-bridge is realized with four switches 1, 2, 3 and 4, driven in pairs by four logic control signals that are generated by the BRIDGE_CONTROL block.

The load may be represented by a DC motor, connectable by the bridge's switches between a supply node Vs and a virtual ground node that is connected to the real ground node GDN through a sensing resistance Rs. Therefore, the current that flows through the load M can be constantly monitored by comparing the voltage present on the sensing resistance Rs with ground potential by a first comparator, ZERO_CROSS_COMPARATOR, and/or with a reference voltage Vref by means of a second comparator, SENSING_COMPARATOR.

The bridge control block contains a logic circuitry able to process a plurality of input command logic signals. Control of the bridge operation is carried out in different modes by means of a pair of input signals of the BRIDGE_CONTROL block, namely an ON/RIC! signal and a TRISTATE signal. For instance, when the ON/RIC! signal is high, it closes a pair of switches, for example 1 and 3, in order to excite the motor M to rotate in a certain direction (Bridge_ON); when the ON/RIC! signal is low, it opens the switches 1 and 3 and closes the switches 2 and 4 so as to allow recirculation (Bridge_RIC) of the discharge current of the motor winding inductance. Naturally these functions are interchangeable for driving the motor in a reverse direction.

When the TRISTATE signal is high, it turns off all four switches (1, 2, 3 and 4) of the bridge, setting the circuit in a so-called tristate (high impedance) condition.

In the example of FIG. 2, the driving system provides the possibility of driving the H-bridge stage in an open-loop mode by exploiting the PWM_GENERATOR block that generates a periodic signal whose duty-cycle may be adjusted in such a way as to vary within a certain range of the switching frequency. As schematically shown in the figure, the PWM_GENERATOR block, according to a common practice, may advantageously employ the system's timing signal (Clock), obtaining, by frequency division, a PWM signal having a period which is a multiple of the period of the system's timing signal. This produces a PWM signal with a reduced frequency compared with the clock frequency and whose duty-cycle may be readily regulated by appropriate circuits.

In practice, the driving of the bridge in an open-loop mode may be implemented by applying the PWM signal produced by the PWM_GENERATOR to the ON/RIC! input pin of the BRIDGE_CONTROL block. In other words, when operating in an open-loop control phase using the PWM generator, the SIGNAL_CONTROL block is practically excluded.

By contrast, the SIGNAL_CONTROL block assumes control when the system is commanded to function in a closed-loop mode, based on the use of the output signals produced by two comparators, the SENSING_COMPARATOR and the ZERO_CROSS_COMPARATOR, respectively, and, according to a fundamental aspect of the invention, of the signal produced by the PWM generator block.

The masking of the switching noise produced by the system of this invention is schematically shown in the diagrams of FIG. 3.

As shown in the diagrams of FIG. 3, during a phase of operation of the control system in a closed-loop mode, the periodic signal produced by the PWM_GENERATOR block, whose rising fronts command the turning on of the pair of switches that connect the load to the supply nodes, according to a given direction of current flow, is exploited for masking the switching transients from OFF to ON of the two switches by keeping the PWM signal high for a controlled period of time (that is by adjusting the PWM signal duty-cycle).

In other words, during such a phase of operation of the system, the PWM signal is used for masking eventual spurious switchings of the output of the SENSING_COMPARATOR for a certain mask interval starting from the turn-on instant of the switches. This effectively prevents the SIGNAL_CONTROL block from unduly commanding a change of state of the bridge switches as a consequence of spurious switchings of the comparator that compares the voltage on the sensing resistance Rs terminals with the reference voltage Vref. This could happen when operating with a particularly low Vref value.

As long as the PWM signal remains high, the SIGNAL_CONTROL block maintains such a conducting configuration of the bridge (Bridge_ON). Obviously, the duration of the masking time interval, established by regulating the PWM signal, determines the minimum turn-on time interval of the bridge.

If the first temporal mask, established by means of the PWM signal, has elapsed, when the voltage on the sensing resistance Rs reaches the value of the reference voltage Vref, the SIGNAL_CONTROL block commutes the bridge in a current recirculation configuration for allowing the discharge of the energy stored in the inductance of the motor winding. At this point, the current that flows through the sensing resistance Rs reverses its direction due to the electrical load inertia. Therefore, the voltage on the noninverting input of the ZERO_CROSS_COMPARATOR becomes negative.

Even during this change of phase, spurious pulses may occur, and for this reason a second masking operation is performed by the signal control block that generates a temporal interval having a programmable duration as soon as the bridge commutes to a current recirculation configuration. In practice during this second mask interval, the control is made independent from the actual state of the ZERO_CROSS_COMPARATOR output, and the bridge remains configured in a current recirculation mode even if the voltage on the sensing resistance Rs becomes positive.

When this second temporal mask elapses, the system maintains control of the voltage present across the sensing resistance Rs terminal. Therefore, as soon as this voltage reaches the null value, the bridge is brought to a state of high impedance (TRISTATE) by commanding into an OFF state all four switches. This prevents the motor from unduly reversing its rotation.

Figure 4:
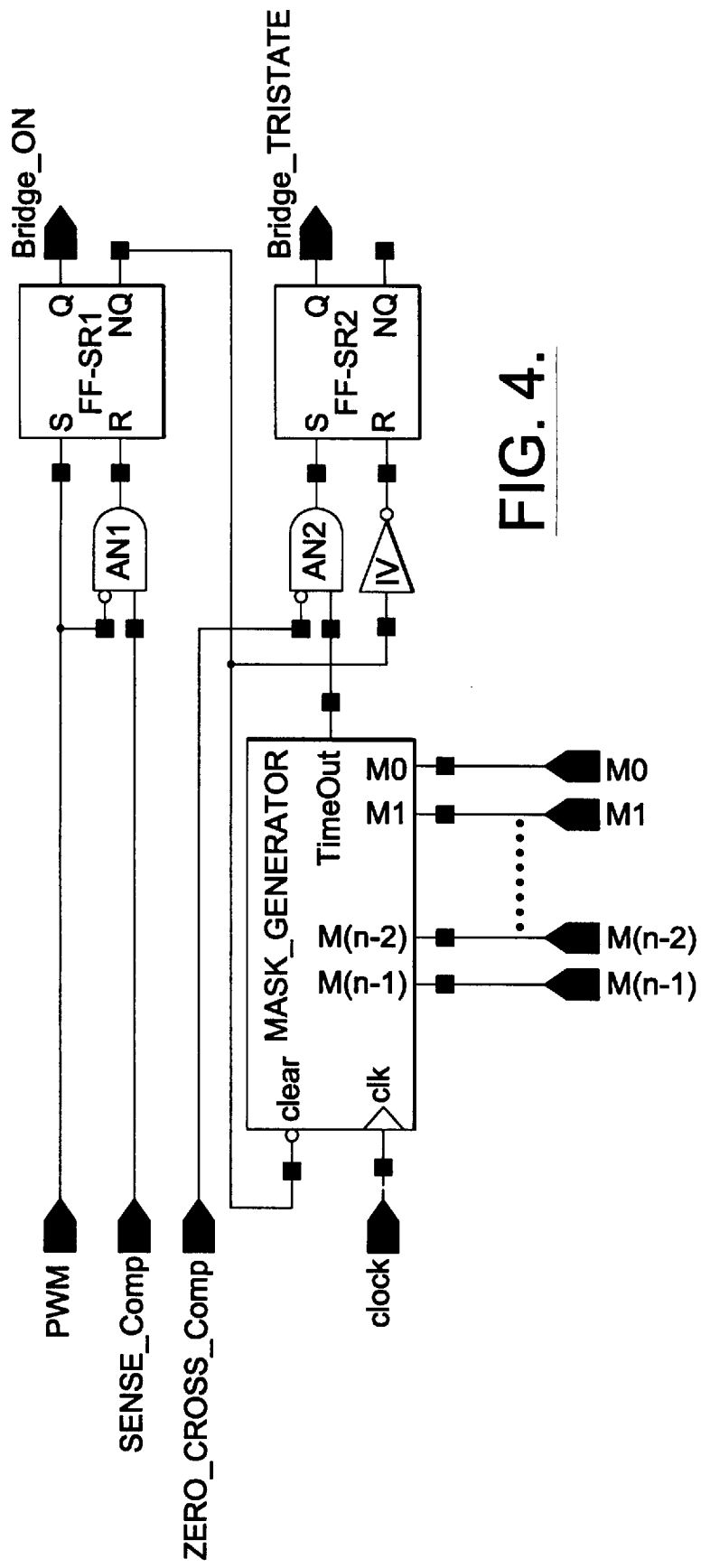
FIG. 4 is a scheme of the SIGNAL_CONTROL block of FIG. 2 according to a first embodiment.

A first embodiment of the SIGNAL_CONTROL block is shown in FIG. 4.

When the PWM signal is high, it forces the flip-flop FF-SR1 to a "set" state (thanks also to the presence of the gate AN1) in such a way that the Bridge_ON output is high, thus determining the turning on of the bridge.

Through the NQ output of the FFSR1 flip-flop, the MASK_GENERATOR and the FF-SR2 flip-flop are forced to a "reset" state.

When the PWM signal becomes low, the FF-SR1 flip-flop remains in a set state until the SENSE_Comp signal becomes high. At this point, the FF-SR1 is reset and the MASK_GENERATOR counter is free to evolve, generating the ZERO_CROSS Mask Time interval shown in FIG. 3. The duration of this mask interval can be programmed in function of the load characteristics, in order to mask the noise spikes caused by the switching. During the counter evolution, the TimeOUT output remains low (as during the preceding reset phase) so that eventual noise spikes on the ZERO_CROSS_COMPARATOR input cannot bring the FF-SR2 flip-flop to a set state, thanks to the AN2 gate. When the TimeOut signal becomes high (that is at the end of the mask interval), FF-SR2 is free to reach a set state and may therefore drive the bridge into a high impedance configuration (Bridge_TRISTATE) as soon as the current flowing through the load reverses its sign (ZERO_CROSS_COMPARATOR=1).

As will be evident to a skilled person, the SIGNAL_CONTROL block can be realized in different ways. In particular, it is possible to eliminate the AN1 gate by using a flipflop of the SR type, intrinsically a "Dominant Set" circuit. In addition, even the circuit that generates the masking signal, MASK_GENERATOR, can be realized in various ways, for example with an analog monostable circuit When a system's clock signal is available and normally used by the PWM_GENERATOR block, it is possible to use a counter for generating a mask interval. To program the mask interval, it is possible to preload a "down-counter" with a certain value during the reset phase and advantageously use the "carry" signal output, which will become high when the counter finishes its counting back to zero. This solution, based on the use of a preloadable down-counter can be dangerous in some applications, since the preload and clock signals are a synchronous, and therefore the "set-up" and "hold" times of the counter flip-flops might be violated.

Figure 5:
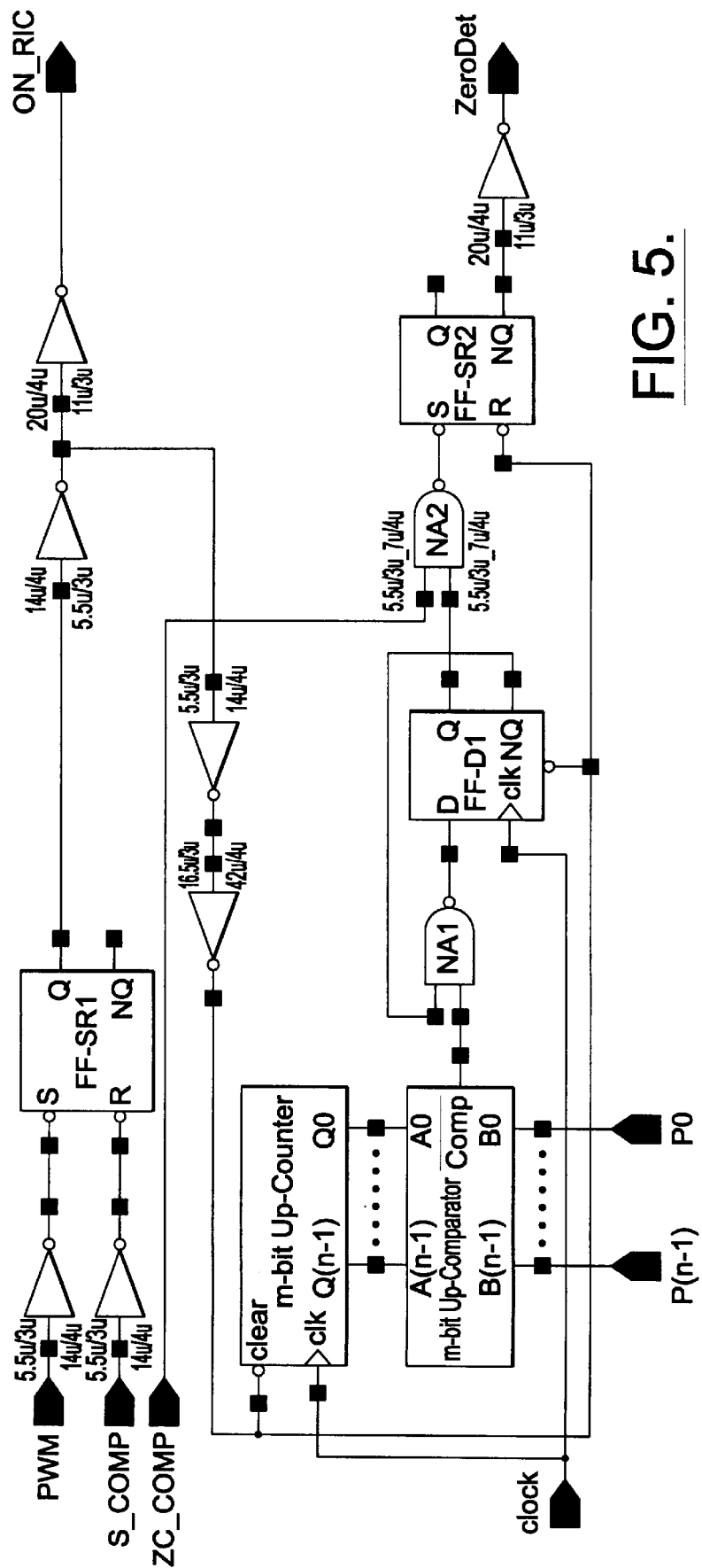
FIG. 5 is a scheme of the SIGNAL_CONTROL block of FIG. 2 according to an alternative embodiment.

A particularly preferred solution is that shown in FIG. 5.

According to this embodiment, the mask generating circuit is formed by an n-bit "up-counter" and an n-bit comparator. During the reset phase, the counter is set to an initial state (for example with all outputs set to zero) and so is the output of the FF-D1 flip-flop. When the reset phase terminates, the counter increments its output at every clock pulse until it reaches the programmed value established for the second comparator data input.

At this point, the comparator output does high and so becomes the output of the FF-D1 flip-flop at the following usable front of the clock signal. Thanks to the gate NA1, the FF-D1 output will remain high until a new phase of reset, so that said output can be used exactly as a TimeOut signal of the circuit of FIG. 3.

This embodiment of the masking signal generator is very reliable because even if the flip-flops timing conditions of "set-up" and "hold" are not complied with, there are not spurious effects because the flip-flops have an input that corresponds in value to their respective output (because an up-counter that starts from a reset state is being used), with the exception of the first flip-flop, which in any case might enter a metastable state wherefrom it will most probably exit at the successive front of the clock signal.

We claim:

1. A method for driving in a closed-loop mode a H-bridge stage composed of at least four switches driven in pairs to pass a current through a load connected to the bridge, to recirculate a discharge current of the load reactance and to place the bridge in a high impedance configuration (tristate) and having a control system that includes a pulse width modulated (PWM) signal generating circuit used for driving in an open-loop mode the bridge, comprising:

masking the decay time of disturbances caused by the switching from an OFF to an ON state of a first pair of switches of the bridge that determine the flow of current in a certain direction through the load by maintaining high for a preestablished interval of time the output of said PWM signal generating circuit;

masking the decay time of disturbances caused by the switching from an ON to an OFF state of said first pair of switches and from an OFF to an ON state of the other pair of switches that provide said current recirculation path, by impeding any subsequent switching for a preestablished number of pulses of a system's clock, forcing a first flip-flop to a set state when the pulse width modulation signal is high to turn on the bridge, and forcing a second flip-flop to reach a set state to drive the bridge into a high impedance configuration.

2. Method according to claim 1, whereby said first mask is regulated by regulating the duty-cycle of said PWM signal.

3. A control system for a H-bridge stage formed of at least four switches (1, 2, 3 and 4), driven in pairs (1-3, 2-4), and comprising a circuit generating a pulse width modulated signal (PWM_GENERATOR) capable of generating a periodic signal with an adjustable duty-cycle (PWM) for controlling said bridge stage during a phase of operation of the system in an open loop mode, a sesing resistance (Rs) functionally connected in series with the bridge stage and crossed by the same current that flows through a load (M) driven the bridge, at least a first comparator (SENSING_COMPARATOR) that compares the voltage on said sensing resistance (Rs) with a reference voltage (Vref), a second comparator (ZERO_CROSS COMPARATOR) that compares said voltage on the sensing resistance (Rs) with the ground potential and a control circuit (SIGNAL_CONTROL) capable of processing the signals produced by said comparators and generating a signal for controlling the switches (1, 2, 3 and 4) during a phase of operation of the system according to a closed-loop mode, said control circuit (SIGNAL_CONTROL) comprising:

first means able to receive as input said periodic signal (PWM) and turn on said first pair of switches (Bridge_ON) that determine the flow of current in a certain direction through the load (M) and prevent further changes of the state of the switches for a preestablished interval of time set by regulating the duty-cycle of said periodic signal (PWM);

second means, started by a change of state of said first pair of switches from an ON to an OFF state and by a simultaneous turning on of the other pair of switches (Bridge_RIC), commanded by said first comparator (SENSING_COMPARATOR), capable of re-enabling switching after a presettable interval of time, first flip-flop means for turning on the bridge when the pulse width modulation signal is high, and second flip-flop means for driving the bridge into a high impedance configuration.

4. The control system as defined in claim 3, characterized in that said second means comprise a preloadable down-counter, counting the pulses of a clock signal.

5. The system as defined in claim 3, characterized in that said second means comprise an n-bit up-counter and an n-bit programmable comparator capable of "reading" said up-counter and generating a re-enabling signal.

6. The control system as defined by claim 4, characterized in that said second means comprise further at least an output flip-flop having a set input driven through an AND or NAND gate (AN2, NA2) suitable for receiving as input a signal produced by said second comparator ZERO_CROSS_COMPARATOR) and a signal generated by said down-counter or by said programmable comparator.

7. The control system as defined in claim 3, characterized in that said first means comprise at least an output flip-flop having a reset input driven through an AND gate (AN1) able to receive as inputs said periodic signal (PWM) and the signal produced by said first comparator (SENSING_COMPARATOR).

8. A control system of a bridge stage, comprising:

two pair of switches in an H-bridge formation for driving a load, said switches being controlled by bridge control circuitry;

signal control circuitry connected to said bridge control circuitry, said signal control circuitry having a clock signal;

a resistor connected between said pairs of switches and ground potential;

a comparator connected to compare the voltage across said resistor with a reference voltage; and a pulse width modulation generator connected to said signal control circuitry to drive said pairs of switches in an open-loop mode;

wherein the output of said generator is kept high for a controlled period of time when one of said pairs of switches turns on in order to mask the decay interval of the switching noise;

wherein said signal control circuitry is programmed to prevent said pairs of switches from further switching for a predetermined number of cycles of said clock signal when one of said pairs of switches turns off and simultaneously the other of said pairs of switches turns on, in order to mask the decay interval of the switching noise and wherein said signal control circuitry further comprises first flip-flop means for turning on the bridge when a pulse width modulation signal is high and a second flip-flop means for driving the bridge into a high impedance configuration.

9. The system of claim 8, wherein each of said switches is a bipolar transistor.

10. The system of claim 8, wherein each of said switches is a field-effect transistor.

11. The system of claim 8, wherein said first flip-flop means further comprises: a first flip-flop connected between said pulse width modulation generator and said bridge circuitry; a first gate connected to said first flip-flop, said pulse width modulation generator, and said comparator; a mask generator counter connected to the output of said first flip-flop; a second gate connected to the output of said mask generator counter; and said second flip-flop means further comprises a second flip-flop connected between said second gate and said bridge circuitry; wherein said first flip-flop is in a set state when the signal of said pulse width modulation generator is high, and said first flip-flop is in a reset state when the signal of said comparator is high; wherein said mask generator counter and said second flip-flop are in a reset state when said first flip-flop is set, said mask generator counter generates a low output during the predetermined number of cycles of said clock signal when said first flip-flop is reset, and said second flip-flop is in a set state when the output of said mask generator counter is high.

12. The system of claim 9, wherein said mask generator counter is an analog monostable circuit.

13. The system of claim 9, wherein said mask generator counter is a prechargeable n-bit down-counter.

14. The system of claim 9, wherein said mask generator counter comprises an n-bit up-counter capable of counting the cycles of said clock signal, and a programmable n-bit comparator connected to read said n-bit up-counter, said n-bit comparator being capable of generating a stop signal.

15. A control system of a bridge stage, comprising:

two pairs of switches in an H-bridge formation for driving a load, said switches being controlled by bridge control circuitry;

signal control circuitry connected to said bridge control circuitry, said signal control circuitry having a clock signal;

a resistor connected between said pairs of switches and ground potential;

a current-mode control loop having a first comparator connected to compare the voltage across said resistor with ground potential and having a second comparator connected to compare the voltage across said resistor with a reference voltage; and a pulse width modulation generator connected to said signal control circuitry to drive said switches in an open-loop mode;

wherein said signal control circuitry comprises a first flip-flop connected to said pulse width modulation generator and said bridge circuitry, a first gate connected to said first flip-flop, said pulse width modulation generator, and said second comparator, a mask generator counter connected to the output of said first flip-flop, a second gate connected to the output of said mask generator counter and said first comparator, and a second flip-flop connected to said second gate and said bridge circuitry;

wherein the output of said pulse width modulation generator is kept high for a controlled period of time when one of said pairs of switches turns on, in order to mask the decay interval of the switching noise;

wherein said signal control circuitry is programmed to prevent said switches from further switching for a predetermined number of cycles of said clock signal when one of said pairs of switches turns off and simultaneously the other of said pairs of switches turns on, in order to mask the decay interval of the switching noise.

16. The system claim 13, wherein said first flip-flop is in a set state when the signal of said pulse width modulation generator is high and in a reset state when the signal of said second comparator is high.

17. The system of claim 13, wherein said mask generator counter and said second flip-flop are in a reset state when said first flip-flop is set, said mask generator counter generates a low output during said predetermined number of cycles of said clock signal when said first flip-flop is reset, and said second flip-flop is in a set state when the outputs of said mask generator counter and said first comparator are high.

18. The system of claim 13, wherein said mask generator counter is an analog monostable circuit.

19. The system of claim 13, wherein said mask generator counter is a prechargeable n-bit down-counter.

20. The system of claim 13, wherein said mask generator counter comprises an n-bit up-counter capable of counting the cycles of said clock signal, and a programmable n-bit comparator connected to read said n-bit up-counter, said n-bit comparator being capable of generating a stop signal.

21. The system claim 13, wherein each of said switches is a bipolar transistor.

22. The system claim 13, wherein each of said switches is a field-effect transistor.

23. A method of driving a load, comprising the steps of:

operating two pairs of switches in an H-bridge formation for driving the load which is connected between a supply node and a virtual ground node through said pairs of switches, said virtual ground node being connected to a real ground node through a resistor;

operating bridge control circuitry connected to turn on one of said pairs of switches in an open-loop mode, to turn off one of said pairs and simultaneously turn on the other of said pairs of switches in a recirculation mode, and to turn off both pairs of switches in a high impedance mode;

operating signal control circuitry, connected to said bridge control circuitry, to send commands to said bridge control circuitry, said signal control circuitry having a clock signal;

using a current-mode control loop to monitor the current flowing through the load, said loop having a first comparator to compare the voltage across said resistor with ground potential and having a second comparator to compare the voltage across said resistor with a reference voltage; and driving said switches in said open-loop mode by a pulse width modulation generator connected to said signal control circuitry;

wherein the output of said generator is kept high for a controlled period of time when one of said pairs of switches turns on in order to mask the decay interval of the switching noise;

wherein said signal control circuitry is programmed to prevent said switches from further switching for a predetermined number of cycles of said clock signal when one of said pairs of switches turns off and simultaneously the other of said pairs of switches turns on in order to mask the decay interval of the switching noise, and further comprising the steps of forcing a first flip-flop to a set state when the output of the pulse width modulation generator is high to turn on the bridge and forcing a second flip-flop to reach a set state to drive the bridge into a high impedance configuration.

* * * * *